(12) United States Patent
Seabaugh et al.

(10) Patent No.: US 7,496,053 B1
(45) Date of Patent: Feb. 24, 2009

(54) WEB-BASED VISUAL DEVELOPMENT ENVIRONMENT

(75) Inventors: Aaron W. Seabaugh, Parker, CO (US); Brian R. James, Greenwood Village, CO (US); Joaquin Jares, Buenos Aires (AR); Martin H. Rosalin, Buenos Aires (AR)

(73) Assignee: Teletech Holdings, Inc., Englewood, CO (US)

( * ) Notice: Subject to any disclaimer, the term of this patent is extended or adjusted under 35 U.S.C. 154(b) by 347 days.

(21) Appl. No.: 11/287,548

(22) Filed: Nov. 23, 2005

(51) Int. Cl.
*H04L 12/28* (2006.01)

(52) U.S. Cl. ........................ 370/254; 709/223
(58) Field of Classification Search ........................ None
See application file for complete search history.

(56) References Cited

U.S. PATENT DOCUMENTS

| | | | |
|---|---|---|---|
| 7,165,041 B1* | 1/2007 | Guheen et al. | 705/26 |
| 2004/0049536 A1* | 3/2004 | Wand et al. | 709/203 |
| 2005/0204332 A1* | 9/2005 | Krishnan et al. | 717/102 |
| 2006/0047780 A1* | 3/2006 | Patnude | 709/219 |
| 2006/0106682 A1* | 5/2006 | Van Dyck et al. | 705/27 |
| 2007/0067444 A1* | 3/2007 | McCarty et al. | 709/224 |
| 2008/0019500 A1* | 1/2008 | Torres et al. | 379/265.02 |

OTHER PUBLICATIONS

"ASP.NET Atlas Powers the AJAX-Style Sites You've Been Waiting For" [online], [retrieved on Feb. 21, 2007]. Retrieved from the Internet <URL: http://msdn.microsoft.com/msdnmag/issues/06/07/AtlasAtLast/>.
Bindows™ 1.31 [online], [retrieved on Feb. 21, 2007]. Retrieved from the Internet <URL: http://www.bindows.net/news/>.
Adobe.com Dreamweaver Support Center [online], [retrieved on Feb. 21, 2007]. Retrieved from the Internet <URL: http://www.adobe.com/support/dreamweaver/downloads_updaters.html>.
Amdocs Customer Enterprise Solutions—Products [online], [retrieved on Feb. 21, 2007]. Retrieved from the Internet <URL: http://www.amdocs.com/site/solutions/ems/products/ermproducts.htm>.
Salesforce.com [online], [retrieved on Feb. 21, 2007]. Retrieved from the Internet <URL: http://www.salesforce.com/products/>.

(Continued)

*Primary Examiner*—Phirin Sam
(74) *Attorney, Agent, or Firm*—Merchant & Gould PC (57) ABSTRACT

A system and method for the rapid and visual web-based development of web-based customer service applications which render rich graphical user interfaces emulating the controls common to traditional desktop applications is disclosed. The rich user interface applications are comprised of scripting languages built with standard browser-based protocols and thus do not require the installation of any additional client-side or proprietary software applications. Not only is the user able to work on a rich user interface web application, but this application then allows the user to create, or develop, another web-based rich-thin-client application using visual programming tools.

20 Claims, 5 Drawing Sheets

OTHER PUBLICATIONS

Onyx Customer Management [online], [retrieved on Feb. 21, 2007]. Retrieved from the Internet <URL. http://www.onyx.com/products/suite/asp>.

Ruby on Rails [online], [retrieved on Feb. 21, 2007]. Retrieved from the Internet <URL. http://www.rubyonrails.org/>.

The Apache Cocoon Project [online], [retrieved on Feb. 21, 2007]. Retrieved from the Internet <URL: http://cocoon.apache.org/>.

Microsoft Office Sharepoint [online], [retrieved on Feb. 22, 2007]. Retrieved from the Internet <URL: http://www.microsoft.com/sharepoint/default.mspx?pf=true>.

"Get Ready for Visual Studio .NET 2003" [online], [retrieved on Feb. 21, 2007]. Retrieved from the Internet <URL: http://www.microsoft.com/mspress/india/pages/vs_net_2003_1772.htm>.

* cited by examiner

WEB-BASED VISUAL DEVELOPMENT ENVIRONMENT

TECHNICAL FIELD

This invention generally relates to development of web-based software applications and, more particularly, to developing rich graphical user interface environments for facilitated web-based user interaction.

BACKGROUND

Prior to the advent and prolific use of distributed network environments such as the Internet, customer service sessions typically occurred over a teleconference between a customer service agent and a customer. These teleconferences, which incidentally are still very popular today, are initiated by a customer placing a phone call to a customer service agent. The customer service agent's phone receives the call through the Public-Switched Telephone Network (PTSN). Typically, such teleconference-based customer service sessions host a plethora of inefficiencies impacting both the customer service provider and the customer. For example, prior to speaking with a customer service agent, the customer is often subjected to a series of time-intensive steps in which the customer is required to select from a number of menu choices which may or may not be applicable to the customer's particular needs. Further, once the customer indicates that he/she would like to speak to a customer service agent, the customer may be placed on hold for a long period of time depending on the availability of agents and the demand of other customers.

In addition, such teleconferencing is inefficient from the customer service provider's standpoint due to the difficulty in predicting the number of customer service agents needed at any given time to respond to in-coming calls. As a result, more agents than are required may be employed at unnecessary cost. Further, both the agent and the customer are hamstrung by the lack of graphical illustrations inherent to the telephony world. Customers may experience difficulties both in orally communicating their questions or problems to the agent and in understanding the answers provided by the agent. Written explanations or illustrations may be abundantly useful to both parties. Illustrations may prove particularly helpful where a question or concern involves a particular product. However, such illustrations are generally not available with teleconferencing.

Because of these problems and inefficiencies, among others, customer service providers now provide for computer-based customer service interaction by way of the World Wide Web. Instead of initiating a customer service session by using the phone, customers may access a website and engage in a web-based customer service session to make inquiries (e.g., technical support) and/or perform tasks (e.g., paying bills). Web-based customer service sessions offer numerous advantages over teleconference-based sessions. For example, the graphical user interface of web-based customer service applications permit customers to view illustrations or written explanations and thus ameliorate the miscommunications which may arise with oral conversations between a customer service agent and a customer. Further, web-based customer service sessions enable a customer to directly target his/her needs on the website and thus reduce the time expended both in navigating through a series of vocal menu choices inapplicable to the consumer's particular needs and in waiting to speak to a service agent. Significantly, web-based customer service sessions are particularly cost-effective for the customer service provider given that fewer agents are required to communicate with customers. Indeed, customers are provided functionality for finding answers to their questions or performing tasks without any help from a live agent. These customer service sessions may be entirely computer-based or, alternatively, involve interaction with a customer service agent.

While there are advantages to performing customer service sessions over the web or other distributed network environments, such web-based systems are not entirely efficient. For example, websites typically do not support rich graphical experiences such as those which customers are accustomed to using in typical desktop environments. Web-based applications typically have primitive, or simplistic, user interfaces which are poorly designed and difficult to use because they are browser-based Internet applications, and browsers were generally never designed to support rich graphical user interface environments. Consequently, browser-based applications typically do not offer users the powerful and easy-to-use, rich interactive features of traditional desktop business applications, such as tab controls, slider panels, animation, toggle buttons, etc.

Current browser-applications typically display only a small set of native controls (e.g., text, radio buttons, checkboxes and drop-down lists) due to compatibility constraints with the various different types of web browsers available on the market. Limiting the native controls to those with common functionality compatibility reduces the need to design web applications to be specific to the particular browser used. However, the web-application interfaces suffer as a result. Additionally, there are difficulties in executing commands or changes on web-based applications due to slow response times and the need to refresh the display screen with any changes made to it. In addition, customer service providers typically incur significant operational costs in employing highly-trained, and thus high-salaried, software developers to create customer service website applications specific for a company's needs. For example, while a customer service inquiry may pertain generally to equipment malfunction concerns, such equipment is likely specific to a company's particular products and therefore must be particularly addressed in the customer service website application for that particular company; hence, compelling the need for experienced (and thus, expensive) software developers.

It is with respect to these and other considerations that the present invention has been made.

SUMMARY OF THE INVENTION

In general, the present invention is related to providing web-based programming tools to aid the development of web-based customer service applications (e.g., web sites) and to improve the user interface environments of such applications. More particularly, the invention provides for the development of browser-based customer service applications with rich graphical user interface environments typical of traditional desktop applications. In an embodiment, the present invention provides a web-based development environment adapted for development of such web-based customer service applications using executable software components, e.g., modular software routines, in which software developers and non-software developers alike may configure and develop these applications.

An embodiment of the present invention is practiced as a method for developing a user interface for a web-based software application. The method involves maintaining a library of executable code modules, or components, in a computing environment. Each executable code module represents one or more user interface controls that are available for display in the web-based application under development. Further maintained in the computing environment is a web-based visual development environment that provides for facilitated application development by providing users visual access to the library to retrieve therefrom the executable code modules maintained in the library.

In response to receiving a request from a client computer to render the web-based visual development environment thereon, the method involves rendering the web-based development environment on the client computer such that identifiers of the one or more user interface controls are displayed on the client computer and are made available for selection by a user for placement on the user interface for the web-based software application under development. When rendered on the client computer, the web-based visual development environment enables the user to select the identifiers of the one or more user interface controls. In response to such selection, the method retrieves the executable code module associated with the selected user interface control from the library and stores that executable code module in source code embodying the web-based software application.

The various embodiments of the present invention may be implemented as a computer process, a computing system or as an article of manufacture, such as a computer program product or computer-readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features, as well as advantages, which characterize the present invention, will be apparent from a reading of the following detailed description and a review of the associated drawings.

DETAILED DESCRIPTION

The present invention and its various embodiments are described in detail below with reference to the figures. When referring to the figures, like structures and elements shown throughout are indicated with like reference numerals. Objects depicted in the figures that are covered by another object, as well as the reference annotations thereto, are shown using dashed lines.

The present invention is generally directed to a programming tool for facilitating the development of web-based customer service applications (hereinafter, "CSAs") and to improve the user interface environments of such applications. With that said, an exemplary embodiment involves creating a web-based application (e.g., website) having an internal or embedded graphical user interface that provides customers with access to customer service related information and tasks via rich user interface controls. However, it should be appreciated that the embodiments described herein are also applicable to concerns other than providing customer service.

In an embodiment, the creation of a web-based CSA does not involve the direct use of any programming code. Rather, application development occurs through the use of visual programming tools, such as, for example, dialogue boxes and drag-and-drop actions. Further, another embodiment of the present invention involves providing developers with web-based access to the visual programming tools. The present invention is hereinafter described in accordance with this embodiment and the visual development environment is consequently referred to as a "web-based VDE". Because visual connecting, as opposed to programming code, is used in building web-based CSAs, the development of such applications may be accomplished by either software developers or non-software-developers, such as business analysts.

Figure 1:
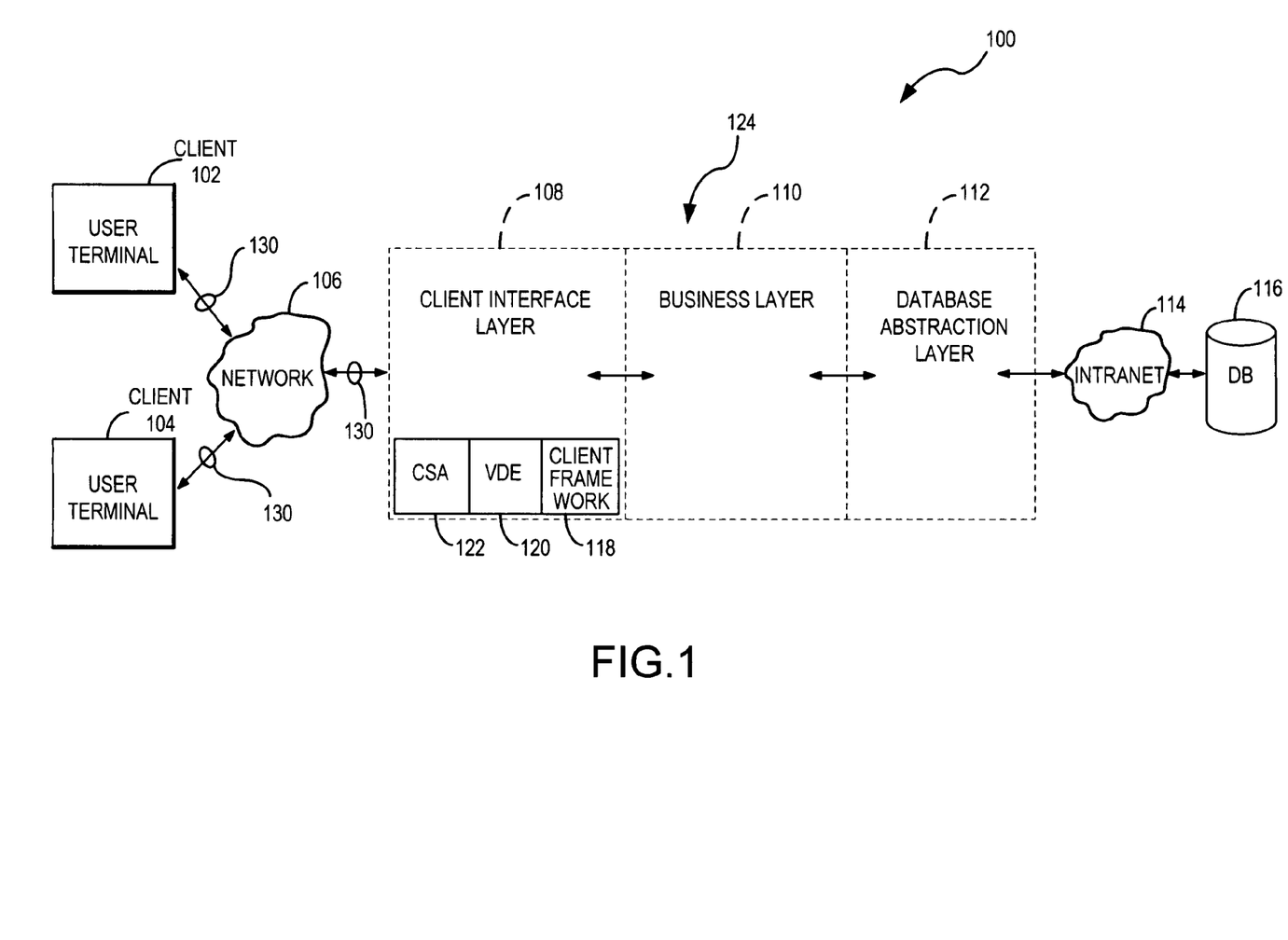
FIG. 1 illustrates a logical representation of a network environment in which customers are provided web-based access to customer service sessions in accordance with an embodiment of the present invention.

Based on this discussion of the general environment in which embodiments of the present invention are applicable, FIG. 1 illustrates, in block diagram form, a logical representation of a network environment 100 for providing customers with web-based access to CSAs in accordance with an embodiment of the present invention. Because FIG. 1 embodies a representation which is "logical" in nature, the network environment 100 is shown in FIG. 1 in general form using a block- and dashed-lines format. In an embodiment, the network environment 100 includes client computers 102 and 104 (hereinafter, "user terminals"), a communication network 106 (hereinafter, "network"), an intranet 114, a database 116 and a development system 124, which is made up of a client interface layer 108, a business layer 110 and a database abstraction layer 112.

The development system 124 is implemented on one or more server computers (not shown), and the three layers (108, 110, 112) of this system 124 interact with one another to provide functionality for creating web-based CSAs 122 and maintaining those web-based CSAs 122 for interaction by users over the network 106. Using dashed lines, the client interface layer 108, the business layer 110 and the database abstraction layer 112 are generally shown such as to not limit these layers to reside on any particular number of servers. Indeed, all three layers may alternatively reside on a single server or on separate servers (e.g., server farm), the implementation of which is a matter of choice.

As depicted in FIG. 1, the network environment 100 may be thought of as having two distinct components: "front-end" clients embodying the user terminals 102 and 104 and a "back-end" server on which the development system 124 is implemented. In accordance with an embodiment of the present invention, the server component can be a personal computer, a minicomputer, or a mainframe that performs, among other functions: data managing, client information sharing, administration functions related to the network, and security services. As noted, a server farm (not shown) may also be used. The network environment 100 is not limited to any particular implementation and instead embodies any computing environment upon which functionality of the environment may be practiced.

The "front end" user terminals 102 and 104 provide customer service providers and their customers access to the "back end" server for various forms of functionality. For example, customer service providers may use the user terminals 102 and 104 to interact with the development system 124 to create web-based customer service applications. On the other hand, their customers may use the development system 124 to interact with the web-based customer service applications 122 created by the customer service providers. Plainly stated, the user terminals 102 and 104 serve as "front-end" components that provide users with functionality to interact with the "back-end" development system 124 to either create or maintain a web-based customer service application or engage in a communication session therewith. For illustration purposes only, the network environment 100 is shown in FIG. 1 and described relative to connecting to only two user terminals 102 and 104; however, it should be appreciated that numerous user terminals may be connected to the network environment 100, and, thus, any number of user terminals 102 and 104 are contemplated to be part of the network environment 100.

Figure 2:
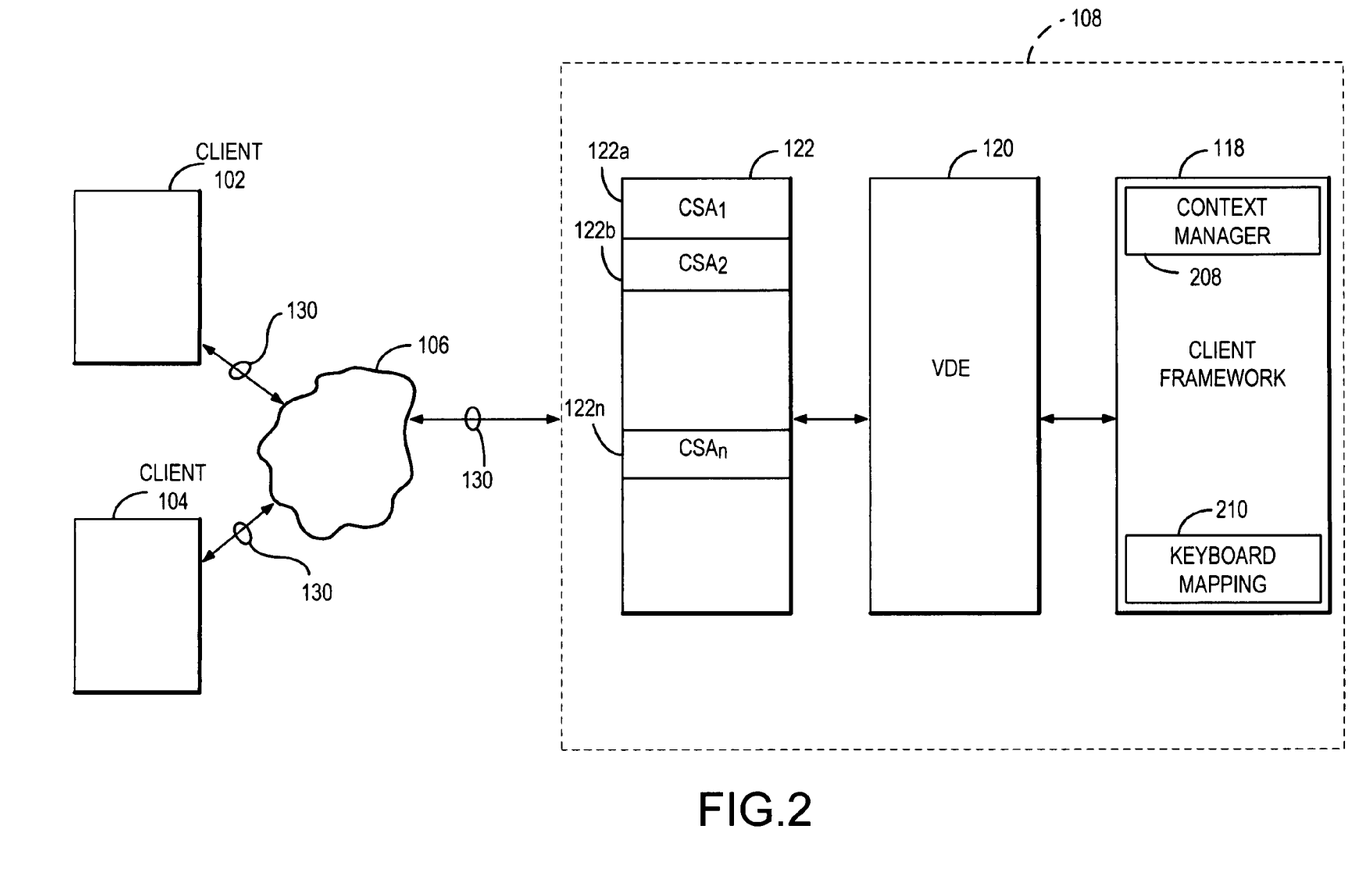
FIG. 2 illustrates a system applicable for use in the network environment of FIG. 1 to provide customers with web-based applications for customer service interaction purposes in accordance with an embodiment of the present invention.

As shown in FIG. 1, the development system 124 is logically divided into three layers 108, 110, and 112, in which protocols at each layer provide certain functions or services as well as interact (shown via two-way arrows) with the protocols in the other layers to accomplish such services or functions. In accordance with an embodiment of the present invention, the client interface layer 108 comprises a Client Framework 118, a web-based visual development environment 120 (hereinafter "VDE"), and a plurality of web-based CSAs 122, exemplary depictions of which are shown in FIG. 2 and described below in conjunction therewith. As its name suggests, the client interface layer 108 interacts with the front-end clients, i.e., user terminals 102 and 104.

The client interface layer 108 links to the business layer 110. With respect to architectural levels, the business layer 110 may be any type of level conventionally known to those skilled in the art and described in accordance with an embodiment of the present invention as a layer which, in a broad sense, functions to process information through the use of various system components. As is well known in the art, various business layers exist which consist generally of a series of libraries and components to aid in the processing of information, or, as with respect to an embodiment of the present invention, to aid developers in the building of web-based CSAs 122. In processing information, the business layer 110 links to the database abstraction layer 112 which controls access to the database 116 (via intranet 114) and translates access requests into common database functionality such that the database environment can be changed without requiring changes to the system as a whole. In this sense, the database 116 may be any type of database environment, such as, but not limited to, an Oracle database or a Microsoft database (e.g., MS SQL Server).

The network 106 may be any type of network conventionally known to those skilled in the art. In accordance with an exemplary embodiment, the network may be a local area network, a wide area network, or a global network (e.g., the Internet or World Wide Web). In another embodiment, the network may be a private network, e.g., an intranet. While the network 106 may be any type of network conventionally known to those skilled in the art, the network 106 is described in accordance with an exemplary embodiment as the "World Wide Web" (i.e., "Web" for short). As such, communications over the network 106 occur according to one or more standard packet-based formats (e.g., H.323, IP, Ethernet, ATM).

Connectivity to the network 106 by the front-end user terminals 102 and 104 and back-end server(s) on which the development system 124 resides is accomplished using wire-based communication media, as shown using data communication links 130. The data communication links 130 may additionally, or alternatively, embody wireless communication technology. It should be appreciated that the manner of implementation in this regard is a matter of choice, and the present invention is not limited to one communication link over another, but, rather, wireless or wire-based technology may each be employed alone or in combination with the other.

Turning now to a more detailed illustration of the development system 124, FIG. 2 illustrates components of the client interface layer 108 and functionally depicts communication between the user terminals 102 and 104 and the client interface layer 108 via the network 106. Again, consistent with the logical representation of FIG. 1, the client interface layer 108 is shown in dashed-line form and the components of the client interface layer 108, namely the Client Framework 118, the web-based VDE 120, and web-based CSAs 122, are shown in block diagram form.

As depicted in FIG. 2, the user terminals 102 and 104 provide users with the ability to interact with the web-based CSAs 122 and the web-based VDE 120 over the network 106. The web-based VDE 120 provides a set of visual programming tools accessible to users by way of the network 106 for use in the development of software applications (e.g., web-based CSAs 122) by users of the user terminals 102 and 104. Thus, an embodiment of the present invention involves a customer service provider interacting with the web-based VDE 120 to create a web-based CSA 122 for use by their customers.

The web-based VDE 120 contains rich-user-interface visual and non-visual controls typical of those seen in traditional desktop environments. In this regard, the web-based VDE 120 has pre-built visual programming tools, including, but not limited to, drag-and-drop abilities, dialogues, visual wizards, icons, buttons, text boxes and/or other prompts. In essence, the user selects user interface controls by clicking on, or otherwise selecting, desired buttons, menus, icons, etc. With the drag-and-drop and selection of controls by use of buttons, menus, etc., users are able to visually connect the widgets on the screen. The web-based VDE 120 is thus a development environment for creating a rich user-interface for the web-based CSAs 122, (e.g., websites) through the use of these visual programming tools (e.g., drag-and-drop actions).

Using the pre-built visual programming tools of the web-based VDE 120, customer service providers are able to interact with the user terminals 102 and 104 to construct web-based CSAs 122, such as web-based CSA No. 1 (122a) and web-based CSA No. 2 (122b) shown in FIG. 2. Using the visual programming tools of the web-based VDE 120, customer service providers visually connect controls to build user interfaces for web-based CSAs 122a and 122b without the knowledge of the underlying code. In creating web-based CSAs 122 through the use of the visual programming tools, users select user interface controls for placement on the web-based CSAs 122 by invoking drag-and-drop functionality, dialog boxes, buttons, icons, menus, etc. In accordance with alternative embodiments, customer service providers may build web-based CSAs 122 solely on their own or with the assistance of an agent familiar with the particular features of the web-based VDE 120.

Once developed and deployed (i.e., made available for customer access), each web-based CSA 122 is maintained on the client interface layer 108 for access by the user terminals 102 and 104. During such interaction, a web-based CSA 122 may be configured to perform any action or provide any information relative to traditional customer service sessions, such as, for example, accept a bill payment, administer a "chat" session with a human customer service agent, accept and/or answer technical questions, provide account-specific information, etc. Indeed, the present invention is not limited to any particular type of information that may be provided or any type of action that may be performed. Rather, embodiments of the present invention are directed to the construction and maintenance of user interface controls within the web-based CSAs 122 using the web-based VDE 120 working in conjunction with the Client Framework 118, which is now described in detail below.

The Client Framework 118 embodies a software architecture framework consisting of a series of control libraries designed for the purpose of enabling developers to rapidly build rich user interfaces for the web-based CSAs 122. With that said, the control libraries provide user interface controls and methods for embedding the controls in the web-based CSAs 122 such that users are operable to manipulate the controls to request performance of actions through the user terminals 102 and/or 104 via the network 106. Exemplary controls include, but are not limited to, buttons for choosing options and scroll bars for moving through a document or positioning text.

The Client Framework 118 is designed to provide the web-based CSAs 122 with controls common to traditional desktop environments. Thus, from the client perspective, the Client Framework 118 enables an end user, or client, to work in a web-based CSA 122 that has the "look and feel" of a traditional desktop application. From the development perspective, the Client Framework 118, by way of its control libraries, provides the executable code (e.g., modular routines) required for implementation of these controls within the web-based CSAs 122. The componentized nature of the Client Framework 118 enables developers to rapidly create web-based CSAs 122 having rich user interfaces by requiring only that the developers refer to the names of the specific modular routines related to the desired controls, as opposed to building the code from scratch for each web-based CSA 122 being developed.

Describing now the interaction between a user terminal 102 and 104 and the client interface layer 108, a web-based CSA 122 or the web-based VDE 120 (depending on whether customer interaction or application development is being administered) is implemented on a "back-end" server communicatively connected to the network 106 and renders web pages on the user terminal 102 or 104. The Client Framework 118 and thus, the control libraries therein, are maintained on the "back-end" server during such interaction, but in an embodiment, all rendering of web pages occurs on a browser application residing on the user terminal 102 or 104. In an alternative embodiment, the present invention involves the executable code providing the user interface controls in the rendered web pages being maintained within the Client Framework 118 and not transmitted to, or otherwise being built on, the browser application.

Development of a web-based CSA 122 using the web-based VDE 120 only involves the selection of certain control features desired for a web-based CSA 122 under development by, for example, name input, control selection, and/or drag-and-drop selection for the specific modular routine upon which the desired control features are based. In response to such selection, the web-based VDE 120 employs the use of the Client Framework 118 to retrieve and incorporate the associated executable code for the selected control(s) into the source code for the web-based CSA 122 under development. Likewise, interaction between a user and a web-based CSA 122 involves the user manipulating user interface controls embedded within web pages being rendered on a browser application by a web-based CSA 122. In response to such manipulation, the web-based CSA 122 employs the Client Framework 118 to execute the code associated with each manipulated control resulting in the performance of some task that is communicated to the browser application.

In accordance with another embodiment, the executable code for each rendered control is cached to the user terminal 102 or 104 during interaction between a browser application implemented on that user terminal 102 and 104 and the client interface layer 108. In this embodiment, when a particular control is rendered, that control is fetched from the Client Framework 118 and provided to the browser application on the user terminal 102 or 104 unless the browser application already has that control cached. Thus, at run-time, when a control is initially requested for rendering on a web page in the browser application, the web-based CSA 122 (if customer is interacting with client interface layer 108 during a customer service session) or the web-based VDE 120 (if customer service provider is developing a web-based VDE 120) fetches the original lines of code stored in the Client Framework 118 and provides this fetched code to the browser application for caching, rendering and interpretation by a browser-specific interpreter, such as, for example, a JavaScript interpreter. In any subsequent requests to render that control, the web-based CSA 122 or the web-based VDE 120 (depending on interaction type, as described above) does not access the Client Framework 118, but rather directs the browser application to execute the associated code from cache.

Because all rendering occurs on the browser application in accordance with this latter embodiment, all programming code stored in the Client Framework 118 and provided to the browser application must be compatible with the particular browser being used by the user terminals 102 and 104. Examples of common browsers are Netscape Navigator and Internet Explorer. The application sent to the browser uses both standard, e.g., JavaScript, XML, and non-standard protocols capable of interpretation by standard browsers, e.g., Microsoft Internet Explorer, version 6.0. The browser changes the script to standard hyper-text markup language (HTML) for rendering on the display of the user terminal 102 and 104. Alternatively, the application may be written in standard HTML code. The Client Framework 118 is thus comprised of a series of libraries consisting of browser-specific code, such as, by way of example, HTML and JavaScript code, which is organized with a basic structure designed to enable developers to rapidly build web-based CSAs 122 with rich user interfaces typical of traditional desktop environments.

The primary functions of the Client Framework 118 are thus two-fold. First, the Client Framework 118 is designed to enable developers to build web-based CSAs 122 with traditional desktop controls. Second, the Client Framework 118 is designed to enable the rapid development of these web-based CSAs 122. Turning to the first main function, Client Framework 118 stores a plurality of user interface controls. Examples of such controls include, but are not limited to: drop-down lists and menus, tab controls, tree controls, slider panels, animation, toggle buttons, etc. Because, as noted, the present invention provides for the rendering of such rich, interactive controls in a browser application, the coding in the libraries of the Client Framework 118 is built from a series of non-visual controls native to the particular browsers and browser versions available, including, but not limited to, Internet Explorer 6.0.

The Client Framework 118 is thus designed to detect the type and version of browser application. As noted, a browser application has native components, or native HTML tags, built into it to control the display of text or controls on particular web pages. By way of example, and for purposes of illustration only, it is noted that one such native component is the <div> tag. Component developers of the Client Framework 118 organize multiple <div> tags in such a way as to create non-native visual controls on the browser-based application. By using multiple lines of code built from native controls, such as the <div> tag, developers are able to build code for rendering rich, interactive user interface controls in web-based CSAs 122. The developers store and maintain this code in the Client Framework 118 so that functionality is properly carried over into the client-side application when the end user pulls up an application. If necessary, this code is interpreted with an appropriate browser-specific interpreter every time it is fetched from the server to the browser.

With respect to the second main function, the Client Framework 118 is designed to enable the rapid development of these rich, interactive web-based CSAs 122 by using modular software routines, or components. The original lines of code for the control libraries are condensed into a single line of code or other section of code, also referred to as a modular routine, which can be invoked by referring to the name associated with that function. In this sense, the controls of the Client Framework 118 are said to be "componentized." By componentizing this code, a web developer using Client Framework 118 need only type the lines of code necessary to call and send data to and from the desired control and need not understand the underlying code of the control to administer such use. Once called, the underlying executable code for the control is fetched from the Client Framework 118 and original lines of code are cached, implemented and interpreted with the browser interpreter.

As shown in FIG. 2, the Client Framework 118 includes a context manager control 208 and a keyboard mapping control 210, which are code modules in a control library that provide exemplary controls available for selection by a user through the web-based VDE 120 for inclusion in a user interface internal to a web-based CSA 122. As in traditional desktop applications, the context manager control 208 is a specific modular routine for making the other visual and non-visual controls, (e.g., buttons, menus, icons, tree controls, etc.) context-sensitive. (It is worth noting that controls may be built upon and within other controls.) Context-sensitivity means that the particular options associated with a particular control are made functional or non-functional, or activated or deactivated, depending on the context of the particular control, as programmed in a pre-determined fashion by the developers of context manager control 208.

For example, and in accordance with an embodiment of this invention, a user may select "real estate" from a tree control. When this control is selected, certain menu options and buttons, among other things, may be deactivated or made non-functional, such as the print button or print option in the file menu. Because virtually an unlimited host of controls may be created in web-based CSAs 122 to emulate the seemingly endless number of controls potentially available in desktop applications, there are numerous context-sensitive parameters which may be made in context manager control 208. The present invention is not limited to any particular user interface controls, which may also be referred to in the art as "components."

Another example of a rich-user-interface control available in these web-development applications is the keyboard mapping control 210. In a typical desktop environment, programmed code exists which allows a user to change the functionality of the keyboard keys to the specific uses or combinations desired by the particular user. For example, while CTRL-P is a common keystroke combination for invoking the "Print" command, a user may change the assigned calling keystroke combination to CTRL-Q, for example. Thus, with the use of Client Framework 118 and web-based VDE 120, keyboard mapping can be used in the web-based world. Such a feature not only improves the usability of the web-based CSA 122 within which it is used, but also the speed with which users familiar with keyboard mapping can create web-based CSAs 122.

Figure 3:
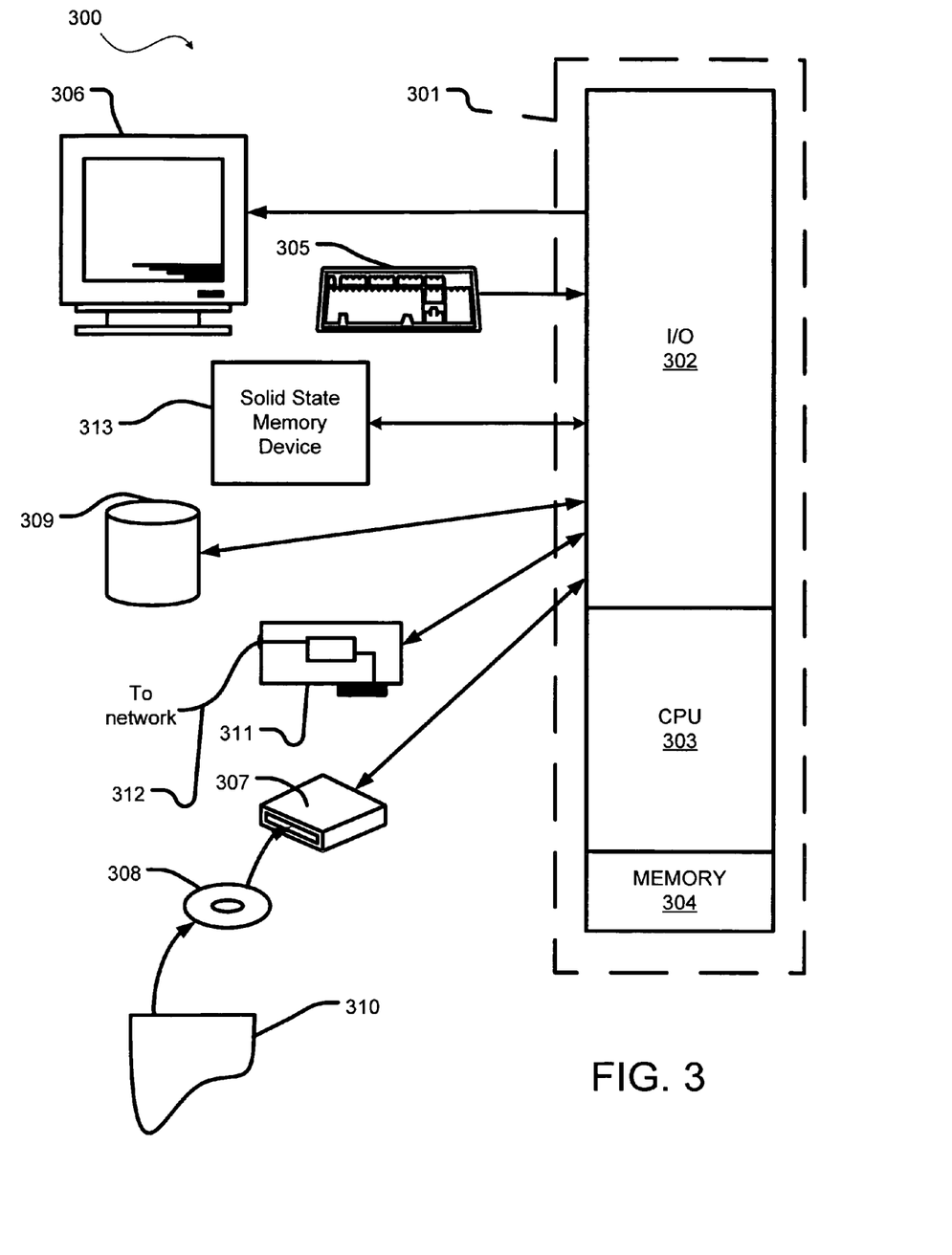
FIG. 3 depicts an exemplary computing system upon which embodiments of the present invention may be implemented.

Turning now to FIG. 3, an exemplary operating environment on which the development system 124 is at least partially implemented encompasses a computing system 300, such as, for example, one or more server computers. Data and program files are input to the computing system 300, which reads the files and executes the programs therein. Exemplary elements of a computing system 300 are shown in FIG. 3 wherein the processor 301 includes an input/output (I/O) section 302, a microprocessor, or Central Processing Unit (CPU) 303, and a memory section 304. The present invention is optionally implemented in this embodiment in software or firmware modules loaded in memory 304 and/or stored on a solid state, non-volatile memory device 313, a configured CD-ROM 308 or a disk storage unit 309.

The I/O section 302 is connected to a user input module 305, e.g., a keyboard 309 (not shown), a display unit 306, etc., and one or more program storage devices, such as, without limitation, the solid state, non-volatile memory device 313, the disk storage unit 309, and the disk drive unit 307. The solid state, non-volatile memory device 313 is an embedded memory device for storing instructions and commands in a form readable by the CPU 303. In accordance with various embodiments, the solid state, non-volatile memory device 313 may be Read-Only Memory (ROM), an Erasable Programmable ROM (EPROM), Electrically-Erasable Programmable ROM (EEPROM), a Flash Memory or a Programmable ROM, or any other form of solid state, non-volatile memory. In accordance with this embodiment, the disk drive unit 307 may be a CD-ROM driver unit capable of reading the CD-ROM medium 308, which typically contains programs 310 and data. Alternatively, the disk drive unit 307 may be replaced or supplemented by a floppy drive unit, a tape drive unit, or other storage medium drive unit. Computer readable media containing mechanisms (e.g., instructions, modules) to effectuate the systems and methods in accordance with the present invention may reside in the memory section 304, the solid state, non-volatile memory device 313, the disk storage unit 309 or the CD-ROM medium 308. The memory locations where data bits are maintained are physical locations that have particular electrical, magnetic, or optical properties corresponding to the data bits.

In accordance with a computer readable medium embodiment of the present invention, software instructions stored on the solid state, non-volatile memory device 313, the disk storage unit 309, or the CD-ROM 308 are executed by the CPU 303. In this embodiment, these instructions may be directed toward administering application of a cleaning process, customized or non-customized, to a beverage dispensing system. Data used in the analysis of such applications may be stored in memory section 304, or on the solid state, non-volatile memory device 313, the disk storage unit 309, the disk drive unit 307 or other storage medium units coupled to the system 300.

In accordance with one embodiment, the computing system 300 further comprises an operating system and one or more application programs. Such an embodiment is familiar to those of ordinary skill in the art. The operating system comprises a set of programs that control operations of the computing system 300 and allocation of resources. The set of programs, inclusive of certain utility programs, also provide a graphical user interface to the user. An application program is software that runs on top of the operating system software and uses computer resources made available through the operating system to perform application specific tasks desired by the user. The operating system is operable to multitask, i.e., execute computing tasks in multiple threads, and in accordance with a preferred embodiment is the Microsoft .Net Framework running on the Microsoft Windows 2000 or 2003 server platform. It should be appreciated, however, that other operating systems are contemplated within the scope of the present invention such as, without limitation, IBM's OS/2 WARP, Apple's MACINTOSH OSX operating system, Linux, UNIX, etc.

In accordance with yet another embodiment, the processor 301 connects to the intranet 114 by way of a network interface, such as the network adapter 311 shown in FIG. 3. Through this network connection 312, the processor 301 is operable to transmit within the computer system 300, as described, for example, in connection with the user terminals 102/104 transmitting media files to the database 116.

With the computing environment of FIG. 3 in mind, logical operations of the various exemplary embodiments described below in connection with FIGS. 4 and 5 may be implemented: (1) as a sequence of computer implemented acts or program modules running on a computing system; and/or (2) as interconnected machine logic circuits or circuit modules within the computing system. The implementation is a matter of choice dependent on the performance requirements of the computing system implementing the invention. Accordingly, the logical operations making up the embodiments of the exemplary embodiments described herein are referred to variously as operations, structural devices, acts or modules. It will be recognized by one skilled in the art that these operations, structural devices, acts and modules may be implemented in software, in firmware, in special purpose digital logic, and/or any combination thereof without deviating from the spirit and scope of the present disclosure as recited within the claims attached hereto.

Figure 4:
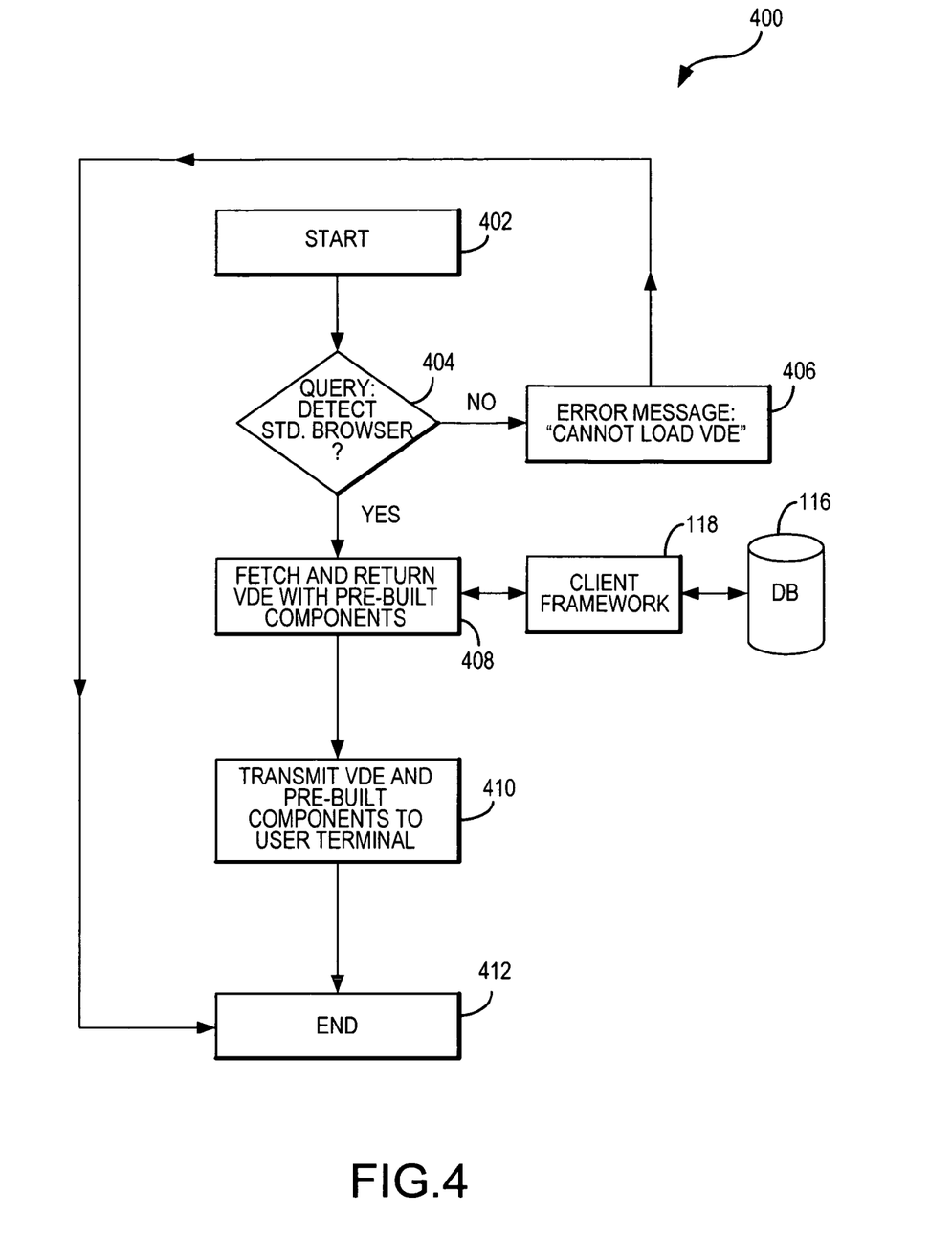
FIG. 4 is a flow diagram illustrating operational characteristics of a process for rendering a web-based visual development environment in the network environment of FIG. 1 in accordance with an embodiment of the present invention.

Turning now to FIG. 4, a process 400 for rendering the web-based VDE 220 on a browser application for use in creating a web-based CSA 122 is shown in accordance with an embodiment of the present invention. As such, the rendering process 400 is described in an exemplary embodiment as being performed by the development system 124, and more particularly, components of the client interface layer 108. For illustration purposes, the browser application is described herein as being implemented on one of the user terminals 102 and 104. However, in accordance with an alternative embodiment, the browser application may be implemented on a user terminal locally connected to the development system 124 by way of the intranet 114. Such an embodiment is particularly useful in circumstances wherein a customer service provider employs an agent or contractor to build a web-based CSA 122 on its behalf. Regardless of implementation, the rendering process 400 is performed using an operation flow that begins with a start operation 402 and ends with a terminate operation 412.

The start operation 402 is initiated in response to receipt of a request by a user (e.g., a customer service provider) to launch the web-based VDE 120. In an embodiment, such a request is received over the network 106 and involves the user interacting with a browser application maintained on the user terminal 102 or 104 to log onto the development system 124, which as noted above, resides on one or more servers connected to the network 106. For example, the user may effectuate such a request by entering a uniform request locator (URL) assigned to the development system 124 in the browser application.

Once initiated, the operation flow of the rendering process 400 passes from the start operation 402 to a query operation 404. The query operation 404 determines whether the browser application is based upon standard protocols and, thus, operable to interpret controls provided by the Client Framework 118. If a standard-protocol-based browser application is not detected, the query operation 404 passes the operation flow to a message operation 406, which displays an error message within the browser application (e.g., using an HTML page) that indicates that the web-based VDE 120 cannot be loaded into that particular browser application. The operation flow of the rendering process 400 then concludes at the terminate operation 412. On the other hand, if a standard browser is detected, the query operation 404 passes the operation flow to a fetch and return operation 408. The fetch and return operation 408 fetches and returns the web-based VDE 120 with visual programming tools and identifiers for a plurality of user interfaces controls from the control libraries which as noted above, are maintained by the Client Framework 118.

The operation flow then passes from the fetch and return operation 408 to a transmit operation 410, which transmits the scripting language and other code embodying the web-based VDE 120, including the visual programming tools and identifiers, to the user terminal 102 or 104 for rendering in the browser application. The web-based VDE 120 embodies standard protocol-based scripting languages, which once received by the browser application are interpreted into standard HTML or XML code and rendered therein. With the web-based VDE 120 launched and the rich user interface of this application displayed to the user through the user terminal 102 or 104, the operation flow of the rendering process 400 concludes at the terminate operation 412.

Figure 5:
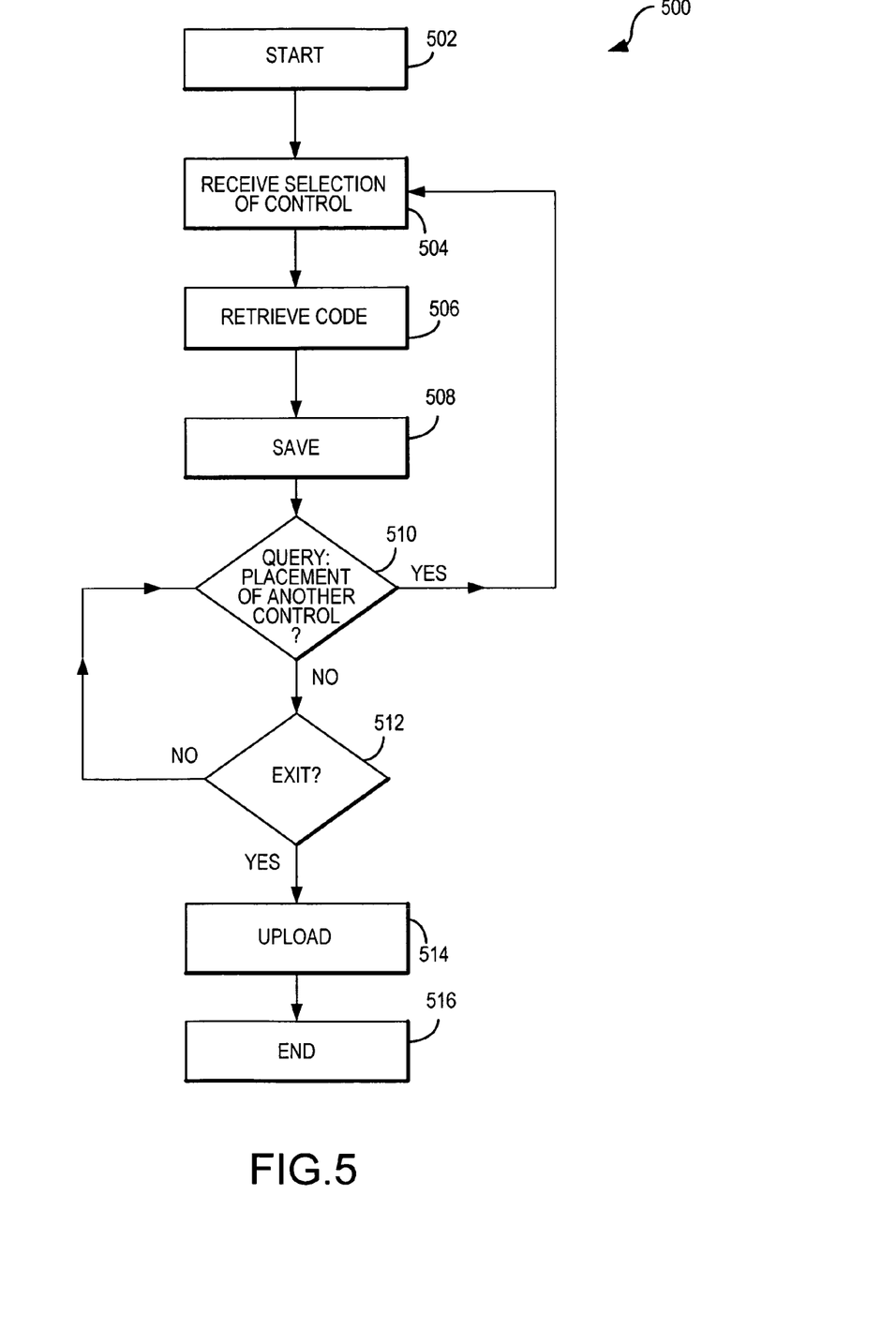
FIG. 5 is a flow diagram illustrating operational characteristics of a process for developing web-based software applications using the web-based development environment rendered in FIG. 4 in accordance with an embodiment of the present invention.

Turning now to FIG. 5, a process 500 for developing a web-based CSA 122 using the web-based VDE 120 is shown in accordance with an embodiment of the present invention. Accordingly, the development process 500 is described herein with reference to developing a web-based CSA 122 using the web-based VDE 120 rendered by the rendering process 400 shown in FIG. 4. The development process 500 is thus described in accordance with an exemplary embodiment as being performed using an operation flow that begins with start operation 502 initiated following the transmit operation 410. From the start operation 502, the operation flow of this process 500 proceeds to a receive operation 504.

The receive operation 504 receives selection of a control by way of a visual programming tool displayed within the browser application (on the user terminal 102 or 104) on the rendered web-based VDE 120. In an embodiment, such selection is accomplished by the user dragging-and-dropping an identifier representing the selected control onto a development workspace using a mouse or other interface selection object (e.g., joystick, keyboard, etc.). From the receive operation 504, the operation flow passes to a retrieve operation 506. The retrieve operation 506 retrieves the executable code associated with the selected control by accessing one or more control libraries maintained on the Client Framework 118. The executable code embodies a sequence of instructions which, when practiced, renders a desired functionality (e.g., performance of an action) associated with the selected control. In an embodiment, the control libraries are normally stored on the Database 116 and, in response to invocation of the development system 124, are retrieved by the data abstraction layer 112 and cached on the Client Framework 118 thereon for use only during the current development session.

After the executable code associated with the selected control has been retrieved, the operation flow passes to a save operation 508. The save operation 508 saves the retrieved executable code to source code for the web-based CSA 122 under development such that, when accessed by a user (e.g., customer) over the network 106, the user is presented with a web page having that selected control. From the save operation 508, the operation flow passes to a first query operation 510. The first query operation 510 determines whether the user has selected of another control for inclusion in the web-based CSA 122 (e.g., by dragging-and-dropping). If so, the operation flow passes back to the receive operation 504 and continues as described above. Otherwise, the first query operation 510 passes the operation flow to a second query operation 512.

The second query operation 512 determines whether the user has indicated a desire to close or exit the web-based VDE 120 and, upon such an indication, passes the operation flow to an upload operation 514, which is described below. However, if the second query operation 512 has not detected an indication to close or exit the web-based VDE 120, the operation flow passes back to the first query operation 510 and continues in a loop between the first (510) and the second (512) query operations until either another control is selected or the user decides to exit the web-based VDE 120. The upload operation 514 stores the web-based CSA 122 to memory on the client interface layer 108 and assigns the web-based CSA 122 a URL or other identifying address for use by users to request access to the web-based CSA 122. From the upload operation 514, the operation flow of the development process 500 concludes at a terminate operation 516.

Having described the embodiments of the present invention with reference to the figures above, it should be appreciated that numerous modifications may be made to the present invention that will readily suggest themselves to those skilled in the art and which are encompassed in the spirit of the invention disclosed and as defined in the appended claims. Indeed, while a presently preferred embodiment has been described for purposes of this disclosure, various changes and modifications may be made which are well within the scope of the present invention.

For example, selection of controls is described as being accomplished using the development process 500 of FIG. 5 by way of drag-and-drop actions. However, other forms of selection are contemplated to be within the scope of the present invention including, without limitation, dialogues, visual wizards, prompts, and text boxes. Additionally, the order of operations shown in FIGS. 4 and 5 is provided for illustrative purposes only and, in accordance with other embodiments, may be modified or performed simultaneously. Furthermore, it should be appreciated that the scope of the present invention accommodates other operations that may be added or removed depending on the needs of the entity (e.g., customer service provider) for which a web-based CSA 122 is being developed.

What is claimed is:

1. A method for developing a user interface for a web-based software application, the method comprising:
    maintaining in a computing environment a library of executable code modules, wherein each executable code module represents one or more user interface controls;
    maintaining on the computing environment a web-based visual development environment operable to access the library to retrieve therefrom the executable code modules maintained in the library;
    receiving a request from a client computer to render the web-based visual development environment thereon to create the user interface for the web-based software application;
    rendering the web-based development environment on the client computer such that identifiers of the one or more user interface controls are displayed on the client computer for selection by a user for placement on the user interface for the web-based software application;
    receiving selection of an identifier for a first of the one or more user interface controls as the user interacts with the web-based development environment over the network connection;
    in response to the received selection, retrieving the executable code module associated with the first user interface control from the library; and
    storing the executable code module associated with the first user interface control in source code embodying the web-based software application.

2. A method as defined in claim 1, wherein the one or more user interface controls comprise a context manager control.

3. A method as defined in claim 1, wherein the one or more user interface controls comprise a keyboard mapping control.

4. A method as defined in claim 1, wherein the rendering act comprises:
    displaying a plurality of visual programming tools operable for use in manipulating the one or more displayed identifiers of the user interface controls to effectuate selection thereof.

5. A method as defined in claim 4, wherein the visual programming tools comprise drag-and-drop functionality.

6. A method as defined in claim 1, further comprising:
    receiving selection of an identifier for a second of the one or more user interface controls as the user interacts with the web-based development environment over the network connection;
    in response to the received selection, retrieving the executable code module associated with the second user interface control from the library; and
    storing the executable code module associated with the second user interface control in the source code embodying the web-based software application.

7. A method as defined in claim 6, wherein the rendering act comprises:
    displaying a plurality of visual programming tools operable for use in manipulating the one or more user interface controls to effectuate selection thereof;
    organizing the selected identifier for the first user interface control relative to the second user interface control using at least one visual programming tool as directed by the user; and
    adapting the source code of the web-based software application to reflect placement of the first user interface control relative to the second user interface control.

8. A method as defined in claim 7, wherein the at least one visual programming tool comprises drag-and-drop functionality.

9. A method as defined in claim 8, wherein the organizing act comprises:
  visually connecting the identifier for the first user interface controls to the identifier for the second user interface control based on drag-and-drop instructions input by the user.

10. A method as defined in claim 1, wherein the act of receiving a request comprises:
  detecting the type of browser and the type of version being used by the client computer.

11. A method as defined in claim 1, wherein the web-based software application is under development for use as an customer service website for use in providing interaction between customers and a customer service provider.

12. A method as defined in claim 1, wherein the computing environment comprises a server.

13. A method as defined in claim 12, wherein the computing environment comprises a server farm.

14. A computer readable medium having computer-executable instructions for performing a method for developing a user interface for a web-based software application, the method comprising:
  maintaining in a computing environment a library of executable code modules, wherein each executable code module represents one or more user interface controls;
  maintaining on the computing environment a web-based visual development environment operable to access the library to retrieve therefrom the executable code modules maintained in the library;
  receiving a request from a client computer to render the web-based visual development environment thereon to create the user interface for the web-based software application;
  rendering the web-based development environment on the client computer such that identifiers of the one or more user interface controls are displayed on the client computer for selection by a user for placement on the user interface for the web-based software application;
  receiving selection of an identifier for a first of the one or more user interface controls as the user interacts with the web-based development environment over the network connection;
  in response to the received selection, retrieving the executable code module associated with the first user interface control from the library; and
  storing the executable code module associated with the first user interface control in source code embodying the web-based software application.

15. A computer readable medium as defined in claim 14, wherein the method further comprises:
  receiving selection of an identifier for a second of the one or more user interface controls as the user interacts with the web-based development environment over the network connection;
  in response to the received selection, retrieving the executable code module associated with the second user interface control from the library; and
  storing the executable code module associated with the second user interface control in the source code embodying the web-based software application.

16. A computer readable medium as defined in claim 15, wherein the rendering act comprises:
  displaying a plurality of visual programming tools operable for use in manipulating the one or more user interface controls to effectuate selection thereof;
  organizing the selected identifier for the first user interface control relative to the second user interface control using at least one visual programming tool as directed by the user; and
  adapting the source code of the web-based software application to reflect placement of the first user interface control relative to the second user interface control.

17. A computer readable medium as defined in claim 16, wherein the at least one visual programming tool comprises drag-and-drop functionality.

18. A computer readable medium as defined in claim 17, wherein the organizing act comprises:
  visually connecting the identifier for the first user interface controls to the identifier for the second user interface control based on drag-and-drop instructions input by the user.

19. A computer readable medium having computer-executable instructions for performing a method for developing a user interface for a web-based software application, the method comprising:
  maintaining in a computing environment a library of executable code modules, wherein each executable code module represents one or more user interface controls;
  maintaining on the computing environment a web-based visual development environment operable to access the library to retrieve therefrom the executable code modules maintained in the library;
  receiving a request from a client computer to render the web-based visual development environment thereon to create the user interface for the web-based software application;
  rendering the web-based development environment on the client computer such that identifiers of the one or more user interface controls are displayed on the client computer for selection by a user for placement on the user interface for the web-based software application;
  displaying a plurality of visual programming tools operable for use in manipulating the one or more displayed identifiers of the user interface controls to effectuate selection thereof;
  receiving selection of an identifier for a first of the one or more user interface controls as the user interacts with the at least one of the visual programming tools over the network connection;
  in response to the received selection, retrieving the executable code module associated with the first user interface control from the library; and
  storing the executable code module associated with the first user interface control in source code embodying the web-based software application.

20. A computer readable medium as defined in claim 19, wherein the visual programming tools comprise drag-and-drop functionality.

* * * * *